United States Patent
Bennett et al.

(10) Patent No.: US 9,816,611 B1
(45) Date of Patent: Nov. 14, 2017

(54) TRANSMISSION WITH INTEGRATED DRUM GEAR BRAKE

(71) Applicant: Hydro-Gear Limited Partnership, Sullivan, IL (US)

(72) Inventors: Michael L. Bennett, Sullivan, IL (US); Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 191 days.

(21) Appl. No.: 14/584,144

(22) Filed: Dec. 29, 2014

Related U.S. Application Data

(62) Division of application No. 13/490,727, filed on Jun. 7, 2012, now Pat. No. 8,919,224.

(60) Provisional application No. 61/494,167, filed on Jun. 7, 2011.

(51) Int. Cl.
| | | |
|---|---|---|
| *F16D 51/00* | (2006.01) | |
| *F16H 63/34* | (2006.01) | |
| *F16D 51/22* | (2006.01) | |
| *B60T 1/06* | (2006.01) | |

(52) U.S. Cl.
CPC ............ *F16H 63/345* (2013.01); *B60T 1/062* (2013.01); *F16D 51/22* (2013.01)

(58) Field of Classification Search
CPC ......... B60T 13/02; F16D 51/162; F16D 51/22
USPC ...... 74/730.1; 188/10, 30, 78, 140 R, 151 R, 188/106 P, 181 A, 325–341
See application file for complete search history.

(56) References Cited

U.S. PATENT DOCUMENTS

| | | | |
|---|---|---|---|
| 673,926 A | | 5/1901 | Sattler |
| 684,833 A | | 10/1901 | Lemp |
| 1,098,576 A | | 6/1914 | Huff |
| 1,399,344 A | * | 12/1921 | Haubert ............... A01B 3/64 180/53.6 |
| 1,797,811 A | * | 3/1931 | Valletta ................. B60T 13/02 188/140 R |
| 1,823,626 A | * | 9/1931 | Peskar ................. E21B 19/008 188/151 R |
| 1,843,195 A | * | 2/1932 | Banker .................. F16H 3/66 188/30 |
| 1,873,458 A | | 8/1932 | Murnane |
| 1,992,375 A | * | 2/1935 | Kolkiewicz ............ F16D 51/12 188/10 |
| 2,018,968 A | * | 10/1935 | Nordberg ............... F16D 57/06 188/292 |
| 2,031,317 A | | 2/1936 | Johnston |
| 2,225,978 A | * | 12/1940 | Carmichael ............ B60T 8/74 188/152 |
| 2,580,381 A | | 1/1952 | Banker |
| 2,854,109 A | * | 9/1958 | Kile ...................... B66D 1/14 188/82.1 |
| 2,984,320 A | * | 5/1961 | Whyte ................... F16D 51/16 188/205 R |
| 3,034,601 A | | 5/1962 | Felburn |
| 3,096,856 A | | 7/1963 | Burnett |

(Continued)

*Primary Examiner* — Christopher Schwartz
(74) *Attorney, Agent, or Firm* — Neal, Gerber & Eisenberg LLP

(57) ABSTRACT

A transmission having an integrated gear and brake mechanism is disposed in a housing, the transmission having a variable drive mechanism, gear train, and an output axle engaged to the gear train. The output axle is driven by a final drive gear having an integrated drum brake within its circumference.

21 Claims, 5 Drawing Sheets

(56) References Cited

U.S. PATENT DOCUMENTS

| | | | |
|---|---|---|---|
| 3,951,465 A * | 4/1976 | Stage | B60T 8/3295 |
| | | | 188/181 A |
| 4,514,145 A | 4/1985 | Wood | |
| 4,613,282 A | 9/1986 | Wood | |
| 5,044,475 A * | 9/1991 | Clark | F16D 51/20 |
| | | | 188/205 R |
| 5,255,763 A * | 10/1993 | Redgrave | F16D 51/22 |
| | | | 188/250 C |
| 5,443,135 A | 8/1995 | Redgrave | |
| 6,019,385 A | 2/2000 | Kelley et al. | |
| 6,119,822 A * | 9/2000 | Baldwin | F16D 51/22 |
| | | | 188/325 |
| 7,044,275 B2 | 5/2006 | Maehara | |
| 7,070,025 B2 | 7/2006 | Maehara | |
| 7,134,276 B1 | 11/2006 | Langenfeld et al. | |
| 7,543,692 B2 | 6/2009 | Clark et al. | |
| 7,926,624 B1 | 4/2011 | Taylor | |
| 8,371,068 B1 | 2/2013 | Kunz | |
| 8,919,224 B1 * | 12/2014 | Bennett | B60T 1/062 |
| | | | 188/78 |

\* cited by examiner

TRANSMISSION WITH INTEGRATED DRUM GEAR BRAKE

CROSS-REFERENCE TO RELATED APPLICATION

This application is a divisional of U.S. patent application Ser. No. 13/490,727, filed on Jun. 7, 2012, which claims the benefit of Provisional Application No. 61/494,167, filed Jun. 7, 2011, the contents of all of which are incorporated herein by reference.

BACKGROUND OF THE INVENTION

This application relates to a transmission having an integrated gear and brake mechanism that is useful in the drive systems of vehicles or utility transports.

SUMMARY OF THE INVENTION

A transmission having an integrated gear and brake mechanism, e.g. the transaxle of a vehicle, is disclosed herein. The integrated gear and brake mechanism provides a compact assembly with improved braking capacity, wherein the brake can be included in a common housing with the transmission. Typically, a small utility vehicle equipped with a hydrostatic transmission or transaxle, such as a lawn tractor, relies on the inherent braking associated with the vehicle's engine and transmission combination when the transmission is returned to neutral. This braking effect requires drive belt integrity between the engine and transmission, a sufficient volume of hydraulic fluid in the hydraulic circuit between the transmission's pump and motor, and gear train integrity between the hydraulic motor and axle. On flat ground, these vehicles will be brought to a stop within a few feet without application of a dynamic brake. Consequently, many such vehicles are equipped with only a static parking brake designed for engagement with the motor shaft or a shaft disposed between the motor shaft and output axle. In other instances, a parking brake may directly engage the cylinder block of an axial piston hydraulic motor.

On sufficient inclines, however, gravity may overcome the vehicle's inherent braking effect permitting the vehicle to slowly move downhill when in neutral. Whether in neutral or not, failure of a drive train component, can result in the vehicle freewheeling down an incline. There is a need for a compact braking mechanism associated with the output axle. When used in a hydrostatic transaxle, the brake of the present invention is effective even if there is a loss of drive force applied to the axle caused by, for example, breakage of gear teeth in the drive train, loss of fluid integrity of the hydraulic circuit, or breakage of an input drive belt. The mechanical brake mechanism disclosed herein acts upon and within the final drive gear engaged to the output axle. The present invention has application to vehicles such as lawn mowers and tractors, garden tractors, snow throwers, and other applications where a compact drive unit is desired.

A better understanding of the objects, advantages, features, properties and relationships of the invention will be obtained from the following detailed description and accompanying drawings.

DETAILED DESCRIPTION OF THE DRAWINGS

Figure 1:
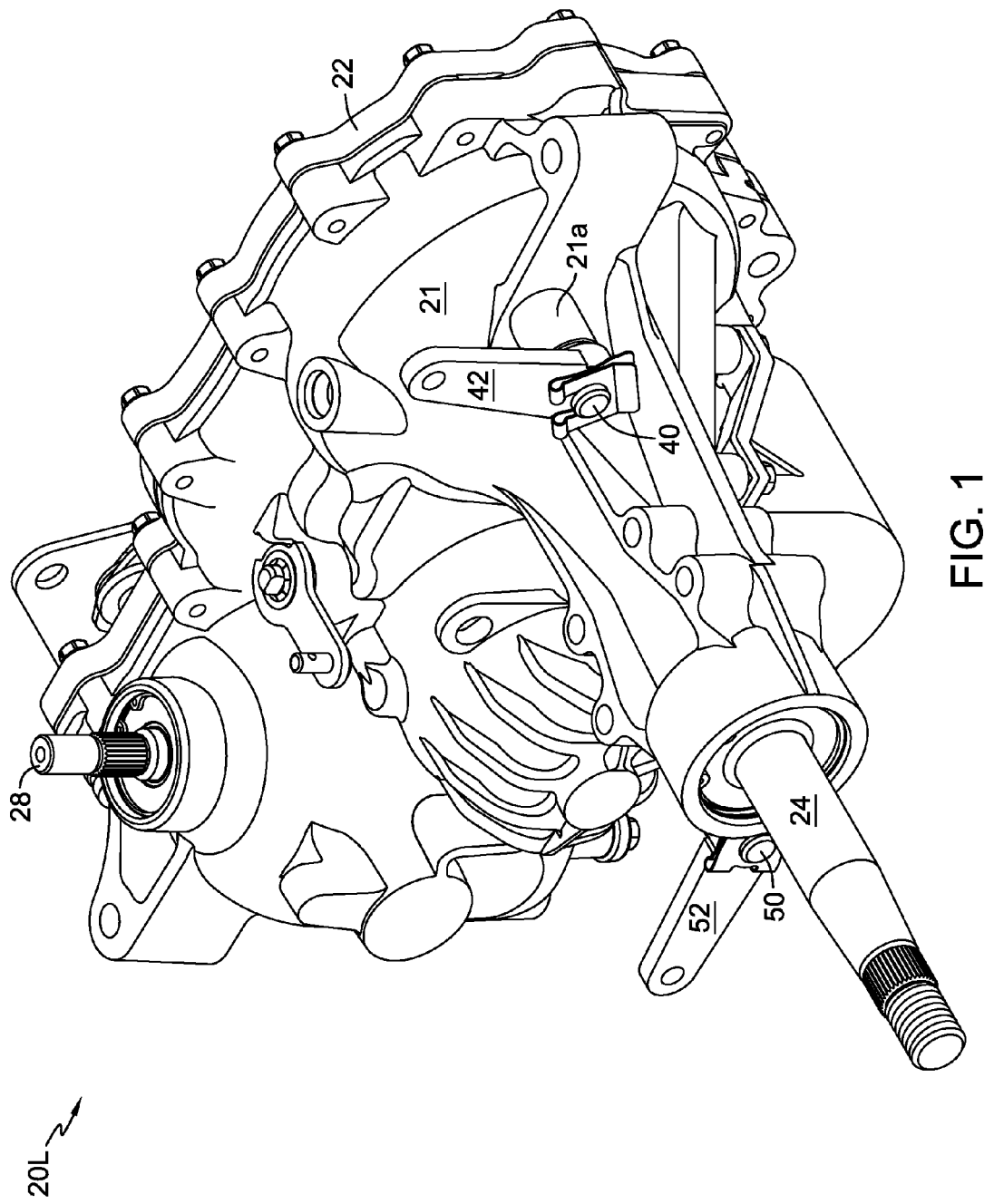
FIG. 1 is a perspective view of a transaxle in accordance with the principles of the invention with the main housing in place.
Figure 2:
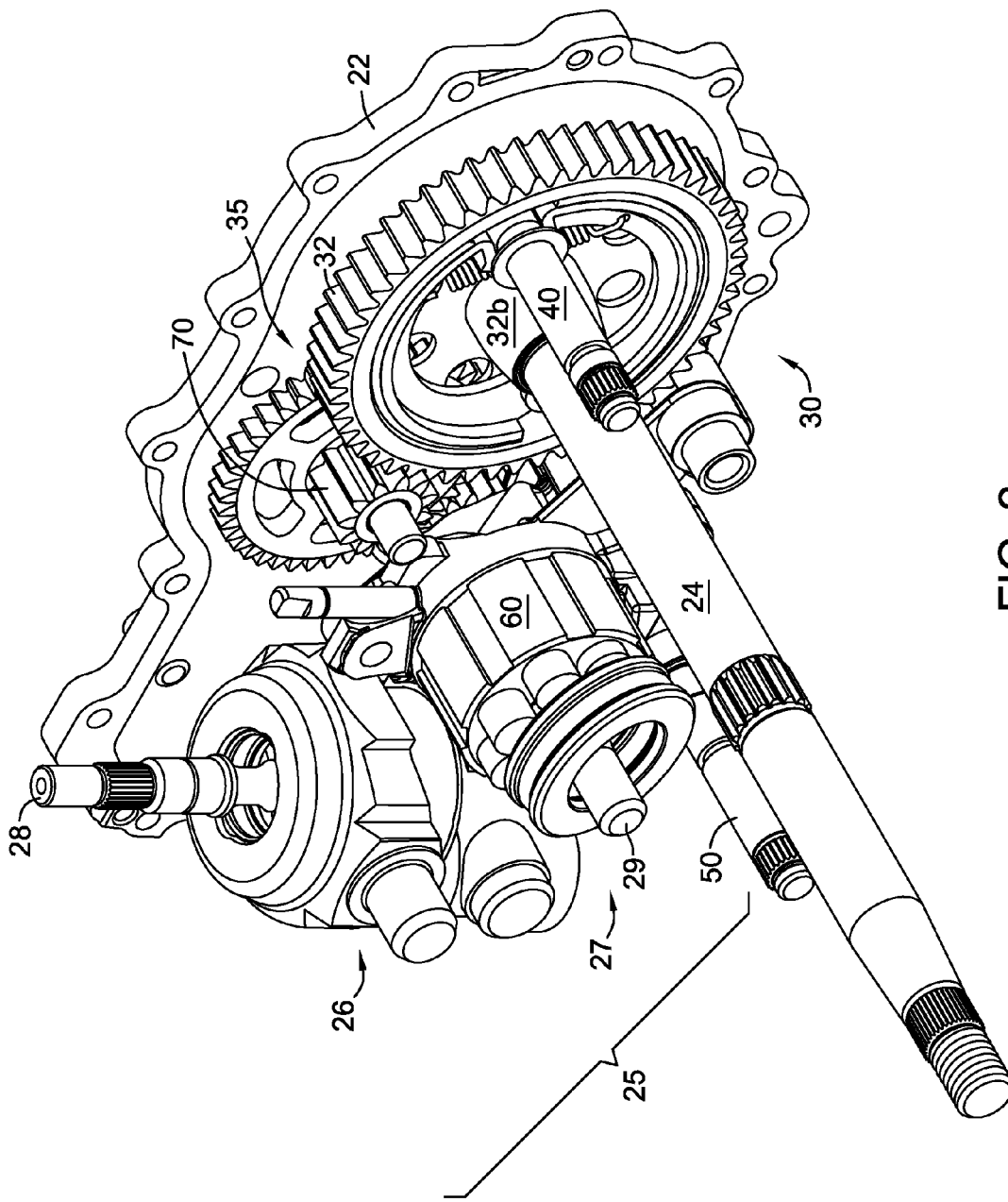
FIG. 2 is a perspective view of the transaxle shown in FIG. 1 with the main housing removed.

FIGS. 1 and 2 depict an exemplary transaxle 20L in accordance with the principles of the invention. The 'L' designates the left-side drive unit of a vehicle 90 such as that shown in FIG. 5. The variable drive mechanism for this transaxle can be an integrated hydrostatic transmission 25 having a variable displacement hydraulic pump 26 and a fixed displacement hydraulic motor 27, the integrated hydrostatic transmission 25 located in a single housing, such as is shown in commonly owned U.S. Pat. Nos. 7,134,276 and 7,926,624, the disclosures of which are incorporated herein by reference. It will be understood that other variable drive mechanisms may be used within the principles of this invention, e.g. an independent hydrostatic transmission mounted to a drive axle mechanism. Similarly, the integrated gear and brake mechanism disclosed herein may be used with a gear drive transmission.

Main housing 21 is fastened to side housing 22 to form a sump in which the integrated hydrostatic transmission 25, gear train 35, and integrated gear and brake mechanism 30 are disposed. As will be understood from the aforementioned patents, hydrostatic transmission 25 transfers rotational force received from a prime mover, such as prime mover 91 in FIG. 5, via input shaft 28 to motor shaft 29. This force is then transferred through a gear train 35, comprising gears 70 and 32, among others, to gear hub 32b and axle 24. One end of axle 24 extends from main housing 21 to drive wheel 93 of vehicle 90 or some other output.

Figure 3:
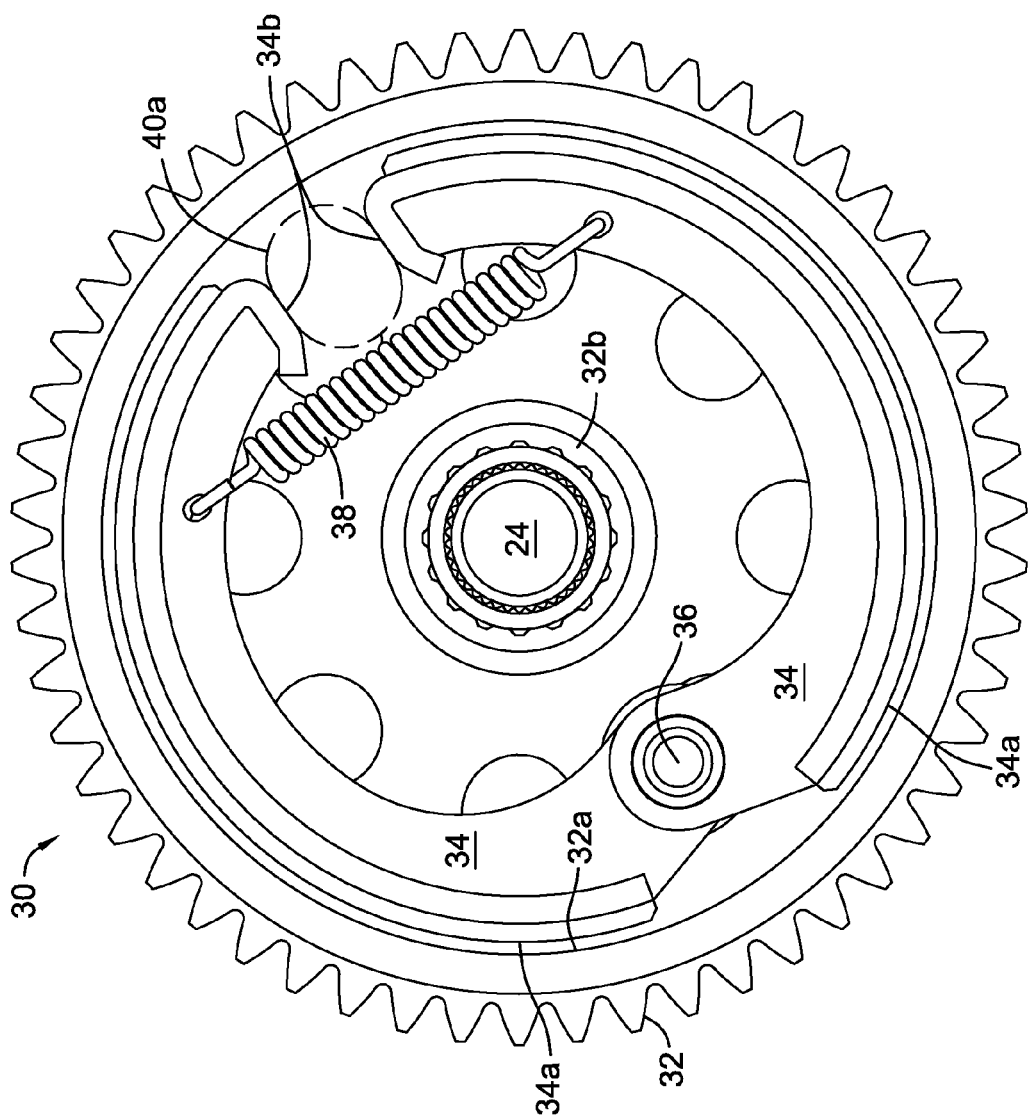
FIG. 3 is an elevational view of the integrated gear and brake mechanism shown in FIG. 2.
Figure 4:
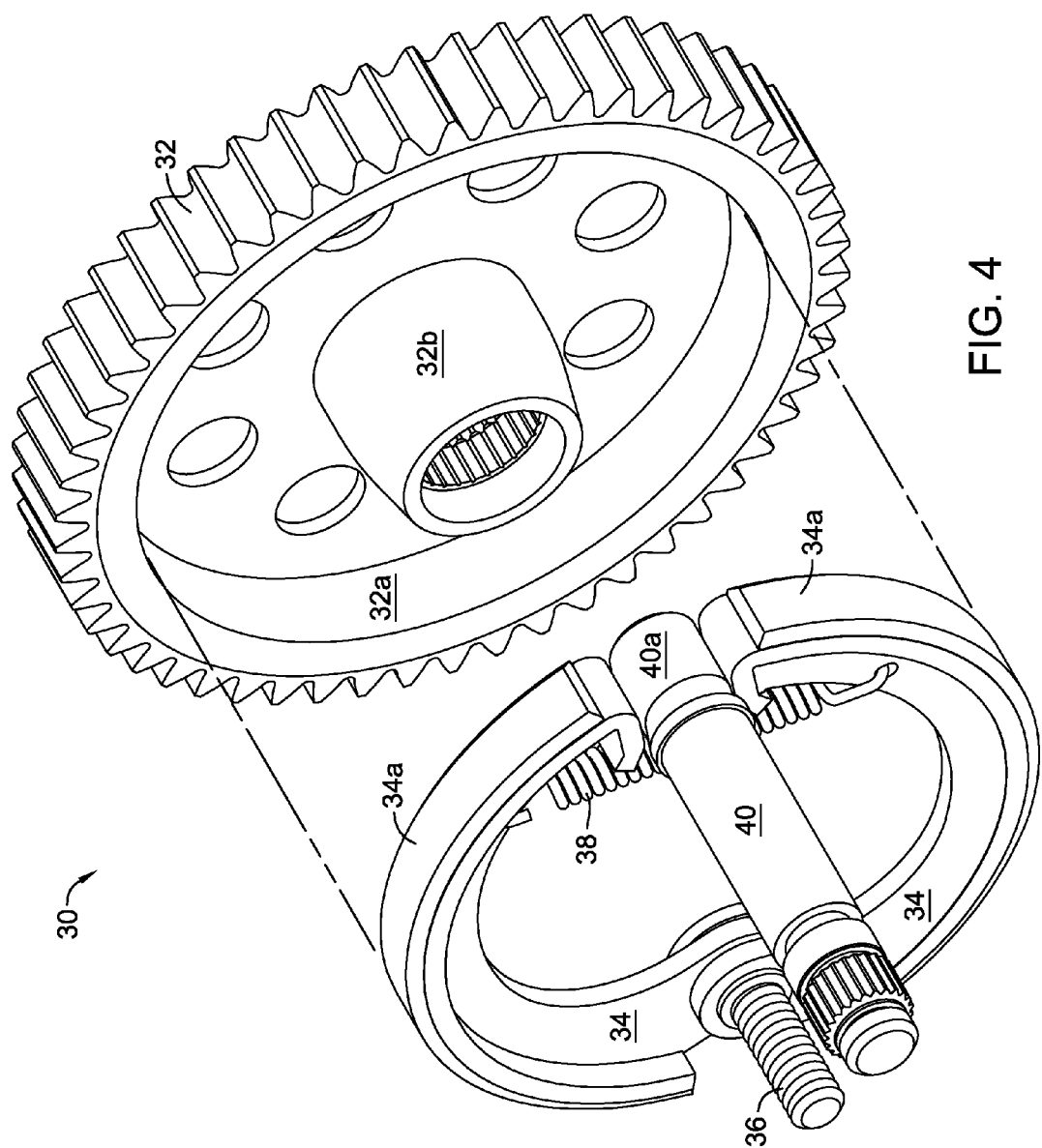
FIG. 4 is a perspective view of the integrated gear and brake mechanism shown in FIG. 2, partially exploded.

The internal workings of integrated gear and brake mechanism 30 can be seen in FIGS. 2-4. One end of brake actuation shaft 40 projects from main housing 21 through a support structure 21a formed on main housing 21, and brake actuation shaft 40 has an axis of rotation that is parallel to the axis of rotation of axle 24. Brake actuation lever 42 is fixed to the external end of brake actuation shaft 40 such that rotation of brake actuation lever 42 causes rotation of brake actuation shaft 40 and brake cam 40a, which may be formed integrally as a portion of brake actuation shaft 40.

As shown in FIGS. 3 and 4, drum gear 32, the final drive gear affixed to axle 24, includes a drum braking surface 32a formed on an inner circumference opposite its external gear form. Brake shoes 34 have brake pads 34a which are brought into contact with drum braking surface 32a when the brake is actuated. Brake cam 40a engages a contact surface 34b on each brake shoe 34. A brake spring 38 connected to the brake shoes 34 maintains the necessary contact between brake cam 40a and contact surfaces 34b to permit brake actuation and properly positions each brake shoe 34 when brake mechanism 30 is in a disengaged state. The ends of each brake shoe 34 opposite contact surfaces 34b are secured by a single brake shoe fastener 36, about which each brake shoe 34 may pivot. Brake shoe fastener 36 passes through an opening in the end of each brake shoe 34 and engages an interior feature (not shown) of main housing 21, thereby pivotally anchoring the brake shoes 34.

The brake portion of the integrated gear and brake mechanism 30 is shown in FIG. 3 in a disengaged state. When cam 40a rotates via rotation of brake actuation lever 42, contact surfaces 34b are forced apart against the bias force of brake spring 38. The resulting motion of brake shoes 34, which is radial with respect to the rotational axis of axle 24, causes brake pads 34a to contact drum braking surface 32a. This contact causes friction which slows and/or stops the rotation of drum gear 32. Because axle 24 is fixed to drum gear hub 32b, the rotation of axle 24 is correspondingly slowed or stopped. Brake mechanism 30 may serve as both a dynamic brake and a parking brake if appropriate control linkages are employed.

An optional parking brake may be added to transaxle 20L as depicted in FIGS. 1 and 2. An end of parking brake actuation shaft 50 projects from main housing 21. Parking brake actuation lever 52 is fixed to the projecting end of parking brake actuation shaft 50 such that rotation of the parking brake actuation lever 52 causes rotation of brake actuation shaft 50, and thus control of the parking brake. FIG. 2 shows parking brake actuation shaft 50 in proximity with slotted motor cylinder block 60, the rotation of which is braked when rotation of parking brake actuation lever 52 actuates the parking brake. Parking brake actuation shaft 50 may have an axis of rotation that is parallel to the axes of rotation of axle 24, motor shaft 29 and brake actuation shaft 40 for simplicity of construction and use. Motor shaft 29 is engaged directly to motor cylinder block 60 to rotate therewith. The details of the block brake mechanism depicted herein are fully described in U.S. Pat. No. 7,926,624 and will not be further described herein. Because drum gear 32 is drivingly connected through gear train 35 to motor shaft 29, and consequently cylinder block 60, braking of motor cylinder block 60 accomplishes braking of axle 24. A transaxle in accordance with the principles of the invention can thus be equipped with a separate parking brake.

Figure 5:
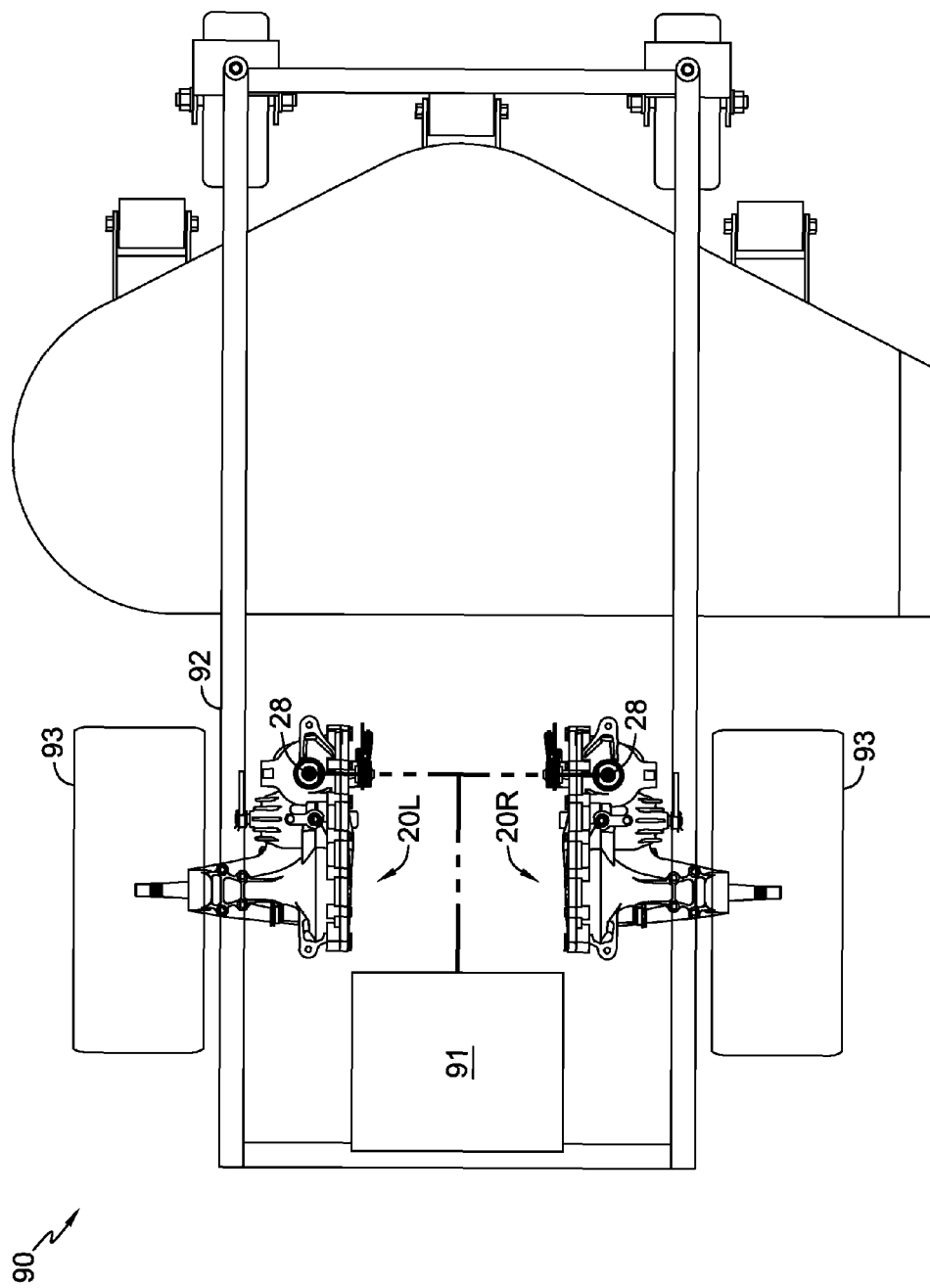
FIG. 5 is a top plan view of a zero-turn vehicle incorporating two transaxles of the present invention.

The transaxle 20L depicted herein is preferably used in tandem in connection with a zero turn vehicle. FIG. 5 depicts vehicle 90 having transaxles 20L and 20R. FIG. 1 depicts the external view of the transaxle 20L, with the understanding that transaxle 20R is essentially identical in construction and is therefore depicted as a mirror image of the transaxle 20L. Transaxles 20L and 20R are mounted to frame 92 by fasteners (not shown). Prime mover 91 provides power through a power transfer means such as a belt and pulley assembly (not shown) to transaxles 20L and 20R, each of which independently drives a wheel 93. Each pump input shaft 28 is splined to accept a pulley (not shown) that is driven by a belt (not shown) running between pump input shaft 28 and the output shaft (not shown) of prime mover 91. Prime mover 91 may be an internal combustion engine, electric motor, or other known motive assembly. It will be understood that the features of the transaxle described herein can also be applied to a single transaxle unit having one or two axles for use in other powered machinery or non-zero-turn vehicle applications.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An integrated gear and brake mechanism for an axle of a drive unit, said integrated gear and brake mechanism comprising:

a housing defining an internal sump and rotatably supporting the axle, a first end of the axle being disposed in the sump and a second end of the axle extending from the housing;

a gear entirely disposed in the sump and drivingly engaged to the axle;

a brake surface formed on an internal circumference of the gear;

a first brake shoe and a second brake shoe, each brake shoe having a brake pad in proximity to the brake surface of the gear;

a fastener disposed in the sump, anchored to the housing, and pivotably engaged with the first brake shoe and with the second brake shoe;

a brake actuation shaft rotatably supported by the housing, a first end of the brake actuation shaft being disposed in the sump and a second end of the brake actuation shaft extending from the housing; and a cam in contact with the brake actuation shaft and with a first end of each brake shoe, whereby the cam is capable of causing a radial motion of both brake shoes upon rotation of the brake actuation shaft.

2. The integrated gear and brake mechanism of claim 1, wherein a second end of the first brake shoe is anchored to a second end of the second brake shoe by the fastener.

3. The integrated gear and brake mechanism of claim 2, wherein the second end of the first brake shoe and the second end of the second brake shoe each comprise an opening through which the fastener passes.

4. The integrated gear and brake mechanism of claim 1, further comprising a spring engaged to each of the first and second brake shoes, wherein the spring is biased to maintain the first and second brake shoes away from the brake surface.

5. The integrated gear and brake mechanism of claim 1, wherein a rotational axis of the brake actuation shaft is parallel to a rotational axis of the axle.

6. The integrated gear and brake mechanism of claim 5, wherein the rotational axis of the brake actuation shaft is positioned internal to the circumference of the brake surface of the gear.

7. The integrated gear and brake mechanism of claim 1, wherein the axle is directly engaged to the gear through a gear hub on the gear.

8. An integrated gear and brake mechanism for an axle of a drive unit, said integrated gear and brake mechanism comprising:

a side housing rotatably supporting a first end of the axle;

a main housing fastened to the side housing to form a sump and rotatably supporting the axle, the axle extending through the main housing;

a gear entirely disposed in the sump and including an internal circumference and a brake surface formed thereon;

one or more brake shoes, each of the one or more brake shoes including a brake pad proximate the brake surface of the gear; and a fastener disposed in the sump, anchored to the main housing, and pivotably engaged with the one or more brake shoes;

a cam contacting each of the one or more brake shoes such that movement of the cam causes each of the one or more brake shoes to engage the brake surface; and a rotatable brake actuation shaft extending through and supported by the main housing and engaged to and capable of causing movement of the cam.

9. The integrated gear and brake mechanism of claim 8, wherein the one or more brake shoes include a first brake shoe and a second brake shoe.

10. The integrated gear and brake mechanism of claim 9, wherein an end of the first brake shoe is anchored to an end of the second brake shoe by the fastener.

11. The integrated gear and brake mechanism of claim 10, wherein the end of the first brake shoe and the end of the second brake shoe each define an opening therethrough through which the fastener passes, and wherein the first brake shoe and the second brake shoe are configured to pivot about the fastener.

12. The integrated gear and brake mechanism of claim 8, wherein a rotational axis of the brake actuation shaft is parallel to a rotational axis of the axle.

13. The integrated gear and brake mechanism of claim 12, wherein the rotational axis of the brake actuation shaft is positioned radially inward of a circumference of the brake surface of the gear.

14. The integrated gear and brake mechanism of claim 12, wherein the cam is integrally formed with the brake actuation shaft.

15. The integrated gear and brake mechanism of claim 8, further comprising a spring connected to each of the one or more brake shoes, the spring biasing each of the one or more brake shoes away from the brake surface.

16. An integrated gear and brake mechanism comprising:
a housing defining a sump;
a gear train disposed in the sump and comprising a first gear and a second gear driven by the first gear, the second gear comprising an inner braking surface;
an axle rotatably supported by the housing and engaged with the second gear, the second gear to provide a torque to the axle;
a first brake shoe disposed in the second gear;
a fastener disposed in the sump, anchored to the housing, and pivotably engaged with the first brake shoe;
a cam slidably engaged with the first brake shoe to selectively push the first brake shoe toward the inner braking surface; and
a brake actuation shaft rotatably supported by the housing and engaged with the cam.

17. The integrated gear and brake mechanism of claim 16, wherein a rotational axis of the brake actuation shaft is parallel to a rotational axis of the axle.

18. The integrated gear and brake mechanism of claim 17, wherein the rotational axis of the brake actuation shaft is positioned internal to the inner braking surface.

19. The integrated gear and brake mechanism of claim 16, further comprising a second brake shoe disposed in the second gear, wherein a second end of the first brake shoe is anchored to a second end of the second brake shoe by the fastener.

20. The integrated gear and brake mechanism of claim 16, wherein a second end of the first brake shoe comprises an opening through which the fastener passes.

21. The integrated gear and brake mechanism of claim 16, further comprising a spring engaged to the first brake shoe to urge the first brake shoe away from the inner braking surface.

* * * * *